(12) United States Patent
Knop

(10) Patent No.: US 12,485,865 B2
(45) Date of Patent: Dec. 2, 2025

(54) BRAKE ACTUATOR UNIT AND ELECTROMECHANICAL BRAKE

(71) Applicant: ZF Active Safety GmbH, Koblenz (DE)

(72) Inventor: Volker Knop, Ulmen (DE)

(73) Assignee: ZF Active Safety GmbH, Koblenz (DE)

( * ) Notice: Subject to any disclaimer, the term of this patent is extended or adjusted under 35 U.S.C. 154(b) by 477 days.

(21) Appl. No.: 17/988,837

(22) Filed: Nov. 17, 2022

(65) Prior Publication Data

US 2023/0151864 A1  May 18, 2023

(30) Foreign Application Priority Data

Nov. 17, 2021 (DE) .......................... 102021129963.2
Aug. 2, 2022 (DE) .......................... 102022119395.0

(51) Int. Cl.
| | | |
|---|---|---|
| *B60T 13/74* | (2006.01) | |
| *B60T 1/06* | (2006.01) | |
| *F16D 55/226* | (2006.01) | |
| *F16D 55/28* | (2006.01) | |
| *F16D 65/097* | (2006.01) | |
| *F16D 65/18* | (2006.01) | |
| *F16D 121/24* | (2012.01) | |
| *F16D 125/40* | (2012.01) | |

(52) U.S. Cl.
CPC .......... *B60T 13/746* (2013.01); *B60T 1/065* (2013.01); *F16D 55/226* (2013.01); *F16D 55/28* (2013.01); *F16D 65/0971* (2013.01); *F16D 65/18* (2013.01); *F16D 2121/24* (2013.01); *F16D 2125/40* (2013.01); *F16D 2200/0004* (2013.01); *F16D 2250/0061* (2013.01); *F16D 2250/0076* (2013.01)

(58) Field of Classification Search
None
See application file for complete search history.

(56) References Cited

U.S. PATENT DOCUMENTS

| | | | | |
|---|---|---|---|---|
| 3,900,084 | A * | 8/1975 | Farr | F16D 65/567 |
| | | | | 188/71.9 |
| 6,213,256 | B1 * | 4/2001 | Schaffer | F16D 65/18 |
| | | | | 188/71.9 |
| 2005/0167211 | A1 * | 8/2005 | Hageman | F16D 65/18 |
| | | | | 188/71.9 |

(Continued)

FOREIGN PATENT DOCUMENTS

| | | | | |
|---|---|---|---|---|
| DE | 3013862 | A1 | 10/1981 | |
| DE | 4121054 | A1 * | 1/1993 | ...... F16D 65/567 |
| DE | 19944876 | A1 | 3/2001 | |

(Continued)

OTHER PUBLICATIONS

DE-4121054-A1: English Abstract (Year: 1993).*

*Primary Examiner* — Melanie Torres Williams
(74) *Attorney, Agent, or Firm* — ROSSI, KIMMS & McDOWELL LLP

(57) ABSTRACT

The present disclosure relates to a brake actuator unit for an electromechanical brake and to an electromechanical brake. The brake actuator unit comprises a spindle, a spindle nut, and a spindle bearing, which receives the spindle, has a spherical bearing contact surface and absorbs the axial reaction forces of the spindle when the brake is actuated.

17 Claims, 2 Drawing Sheets

(56) References Cited

U.S. PATENT DOCUMENTS

2009/0045018 A1* 2/2009 Baumgartner .......... F16D 65/18
188/72.2
2011/0011191 A1* 1/2011 Osterlaenger ......... F16C 33/543
74/89.23

FOREIGN PATENT DOCUMENTS

| DE | 60003887 T2 | 1/2004 |
| --- | --- | --- |
| DE | 102007042654 A1 | 3/2009 |
| DE | 102008062180 A1 | 9/2009 |
| DE | 102010040426 A1 | 4/2011 |
| DE | 102009036884 A1 | 5/2011 |
| DE | 102011005517 A1 | 9/2012 |
| DE | 112013005570 T5 | 8/2015 |
| DE | 102016104562 A1 | 9/2017 |
| DE | 102016116967 A1 | 3/2018 |
| DE | 112019005756 T5 | 8/2021 |
| WO | 1999045292 A1 | 9/1999 |
| WO | 2005124180 A1 | 12/2005 |
| WO | 2019118289 A1 | 6/2019 |

* cited by examiner

BRAKE ACTUATOR UNIT AND ELECTROMECHANICAL BRAKE

CROSS-REFERENCE TO RELATED APPLICATION

This application claims priority to German Priority Application No. 102021129963.2, filed Nov. 17, 2021 and German Patent Application No. 102022119395.0, filed Aug. 2, 2022, the disclosure of which is incorporated herein by reference in its entirety.

TECHNICAL FIELD

The present disclosure relates to a brake actuator unit and to an electromechanical brake.

BACKGROUND

In electromechanical brakes, a brake piston produces an application force via which corresponding friction pads are brought into engagement with the brake disc. As the force intensity of the application force increases, the phenomenon of the displacement of the force application point on the brake disc or the friction pads occurs. As a result of the elasticity of the brake housing of the brake and the compressing friction pads, the force application point of the application force is displaced in the radial direction. The point of application of force is likewise displaced in the tangential direction relative to the rotational movement of the brake disc. As a result, the force application point of the reaction forces caused by the application force, which are absorbed by the brake housing, is therefore displaced in the same way. As a result, the drive which effects the linear movement of the brake piston can become unstable with respect to its orientation and mounting. In other words, angular misalignments occur between individual components of the drive owing to off-centre force components of the reaction forces. This causes increased wear and a non-optimal force geometry, with the result that the application forces which are brought about are adversely affected.

There is therefore a need to eliminate or at least reduce the disadvantages of the prior art.

SUMMARY

A brake actuator unit for an electromechanical brake is provided, whereinthe brake actuator unit comprises a spindle, a spindle nut, a brake piston and a spindle bearing, which receives the spindle, has a spherical bearing contact surface and absorbs the axial reaction forces of the spindle when the brake is actuated, in particular when the brake is closed and/or opened.

"Closing" is to be understood to mean an actuation of the brake in which the application force is increased at least in phases; "opening" is to be understood to mean an actuation of the brake in which the application force is reduced at least in phases. In this case, actuation of the brake can comprise successive phases of "closing" and "opening", for example in the context of an anti-lock control operation.

The brake actuator unit set up in this way makes it possible to compensate for off-centre force components. A restoring force in the direction of the axis of rotation of the spindle is brought about by the spherical bearing contact surface. In this way, the orientation and mounting of the individual components of the brake actuator unit, in particular the symmetry with respect to the rotation axis of the spindle, can be improved. Overall, this leads to an improved application of force to the brake piston and to reduced wear.

A spherical bearing contact surface is to be understood, in particular, as meaning a bearing surface which has a spherical contour. In particular, the spherical bearing contact surface can be convex or concave in shape. A restoring force in the direction of the rotation axis of the spindle is then brought about by the curvature of the spherical bearing contact surface. Here, the spherical contour ensures that the restoring force increases with increasing distance of the force application point from the axis of rotation of the spindle, This means that, when the force application point is suitably selected, greater restoring forces are brought about, which force the spindle into an orientation along the rotation axis.

The spindle bearing can have a rotational symmetry. As a result, the spindle bearing can be embodied identically on all sides with respect to the rotation axis of the spindle.

The brake actuator unit can have a spindle drive. Via the spindle drive, the spindle nut, which is locked against rotation, can be moved in the axial direction. Since the spindle nut interacts with the brake piston, the brake piston can thus apply an application force to at least one brake pad of the brake, thus enabling frictional engagement with a brake disc to be generated. This means that the spindle can be rotated about the rotation axis, and that this rotation causes a translational movement of the spindle nut along the axial direction, which is passed on to the brake piston in order to provide application forces for at least one brake pad. As a result of the generated application forces, reaction forces occur, which are centred with respect to the rotation axis of the spindle via the spherical bearing contact surface. The transverse forces occurring are compensated.

The spindle nut can be arranged adjacent to the brake piston, in particular in the axial direction. As a result, the transmission of force from the spindle nut via the brake piston to the brake pad is simplified since the components are arranged adjacent in the axial direction.

As an option, a spindle drive on which the spindle is based can have a recirculating ball screw. In the case of a recirculating ball screw, balls transmit the force between the spindle and the spindle nut. Owing to the rolling movement of the balls, friction and wear are reduced in a ball screw drive.

The recirculating ball screw is free of self-locking. This means that, on account of elasticities inherent in the system, the spindle nut also moves back automatically into the completely retracted position when it is no longer actively loaded into an extended position via a motor, for example an electric motor. Likewise, the brake piston can then be moved back into the completely retracted position as soon as the spindle nut is no longer being acted upon. In the fully retracted position of the brake piston, the application force is completely reduced, and therefore the brake is completely "open".

The brake actuator unit can comprise a cup sleeve, which has a base and which accommodates the brake piston and the spindle nut at least partially in its interior space. In this case, the interior space refers to a free interior volume which is enclosed by the side wall and the base of the cup sleeve and is bounded by the side wall and the base. Since both the spindle nut and the brake piston can be moved along the axial direction, these components may generally also be arranged only partially in the interior space of the cup sleeve and extend at least partially beyond ft. The cup sleeve ensures that the brake actuator unit represents a closed subassembly of the brake which can be delimited with respect to other parts of the brake, for example can also be sealed. As a result, the assembly outlay is also reduced since the brake actuator unit can be assembled as a whole.

Optionally, the cup sleeve is arranged in a brake housing of the brake actuator unit so as to be secured against rotation. For example, a positive connection can be provided between the brake housing and the cup sleeve, which prevents rotation of the cup sleeve with respect to the brake housing.

The positive connection provided for securing the cup sleeve against rotation can have a slot-and-key connection or a tangential-pin connection.

The spindle bearing can be supported on the base of the cup sleeve. The cup sleeve is oriented in such a way that the open end is arranged in the direction of the brake disc and of the brake pad, that is to say on the brake pad side, and that the base of the cup sleeve is arranged opposite thereto in the axial direction. This means that the generated application forces act in the axial direction along the open end of the cup sleeve while the reaction forces occurring as a result act in the direction of the base. Because the spindle bearing is supported on the base, the spindle bearing is thus arranged between the base and the spindle along the direction of action of the reaction forces. As a result, the spindle bearing can absorb the reaction forces particularly well and develop the centring effect.

As an option, the spindle bearing is an axial bearing via which the axial reaction forces of the spindle are absorbed. In particular, the axial bearing can comprise an axial rolling bearing. The axial bearing ensures the rotatability of the spindle relative to the cup sleeve without an increased frictional torque occurring in the process.

The spindle bearing can have, in particular opposite the spherical bearing contact surface, a planar contact surface, on which the rolling elements roll. As a result, the spindle bearing, with the spherical bearing contact surface and the opposite, planar contact surface, ensures the most uniform possible contact pressure between the rolling elements and the bearing ring because the degrees of freedom of rotation transversely to the rotation axis of the spindle are not withdrawn and thus microscopic and macroscopic angular displacements or off-centre force effects can be compensated.

A bearing disc is can be arranged axially between the base of the cup sleeve and the rolling elements, which bearing disc is pressed into the cup sleeve in a manner such that it is secured against rotation by frictional engagement and/or positive engagement. Owing to its geometry, the cup sleeve represents a more complex component than the bearing disc. Via the bearing disc, the base of the cup sleeve can be protected from damage by the rolling elements (if these were in direct contact with the base). If necessary, only the bearing disc or the axial bearing needs to be exchanged but not necessarily the cup sleeve.

In particular, the bearing disc can have two opposite planar contact surfaces, one of which is in contact with the base of the cup sleeve and one is provided for the rolling of the rolling elements thereon. This results in the additional advantage that the manufacturing outlay for ensuring the quality of the contact surface of the bearing disc for contact with the axial bearing is lower than would be the case for the base of the cup sleeve.

The brake actuator unit can have a brake housing, in which the cup sleeve, the spindle nut and the brake piston are arranged. The cup sleeve has an axial stop, via which it is supported on the brake housing when the brake is actuated. As a result, the reaction forces, starting from the base of the cup sleeve, can be transmitted to the brake housing via the side wall of the cup sleeve. Thus, the entire brake housing acts as a force-supporting device with respect to the reaction forces to be absorbed.

As an option, the stop is a radial shoulder formed on the cup sleeve or a fastener attached to the cup sleeve.

In particular, the radial shoulder can be integral with a side wall of the cup sleeve.

The fastener can comprise a snap ring. The snap ring can be arranged in a radial groove of the cup sleeve, for example. The snap ring can also be multilayered.

The cup sleeve can be inserted axially into the brake housing and supported radially therein. This means that the brake housing has a recess which corresponds at least partially to the outer contour of the cup sleeve. In this case, manufacturing tolerances and gap dimensions must be taken into account. Overall, however, the manufacture of the brake actuator unit is thus simplified since the cup sleeve fits into the recess in the brake housing.

As an option, a rotary lock is provided between the cup sleeve and the spindle nut, which is accommodated therein in a linearly displaceable manner. The rotary lock permits a linear movement of the spindle nut but prevents rotation of the spindle nut relative to the cup sleeve. This makes it possible to prevent the spindle nut, which is in contact with at least one brake pad at least indirectly via the brake piston, from rotating about the axial direction with respect to the brake pad. Such a rotation would worsen the contact brought about by the brake piston. The contact between the brake piston and the brake pad is thus improved by the rotary lock.

A seal is can be provided on the brake pad side between the brake piston and the cup sleeve. As a result, the interior space provided by the cup sleeve can be sealed off from other parts of the brake housing, In particular, the spindle drive arranged in the interior space of the cup sleeve is thus protected against contamination.

The brake housing has or forms a brake caliper.

The spindle can have, on the brake pad side, a cross-sectionally thickened shank section, which has a thread groove of the spindle on the outer circumferential surface. Furthermore, the spindle has a drive shaft extension of smaller cross section than the shank section and a transitional section between the shank section and the drive shaft extension. The spherical bearing contact surface rests against a complementary contact surface on the transitional section. In other words, the radial extent of the spindle varies along the axial direction, to be precise in such a way that the spindle has a comparatively small radial extent at the end opposite the brake pad, and a comparatively large radial extent at the brake pad end. Since the transitional section of the spindle is arranged between these sections and represents a taper of the spindle with respect to the radial extent, the outer surface of the transitional section can be used for contact with the spherical bearing contact surface.

In particular, the thread can be present on the thickened shank section of the spindle on the brake pad side. Owing to the fact that the contact between the spindle and the spindle bearing is provided in the region of the transitional section of the spindle, the spindle bearing bounds the thickened shank section in the direction of the drive shaft extension. If the core diameter of the thickened shank section is smaller than the outside diameter of the spindle bearing, the spindle bearing ensures that a separate thread run-out of the spindle drive in the direction of the transitional section can be avoided. As a result, length improvements along the axial direction can be achieved, particularly in the case of large thread pitches of the thread groove of the spindle drive. Furthermore, the manufacturing outlay of the brake actuator unit is reduced.

In particular, the complementary contact surface on the transitional section can be of convex or concave shape.

One of the two contact surfaces, that is to say either the spherical bearing contact surface or the complementary contact surface of the transitional section, can be of convex shape, while the other of the two contact surfaces can be of concave shape.

The spherical bearing contact surface can have a first radius of curvature and the complementary contact surface of the transitional section has a second radius of curvature. The first radius of curvature and the second radius of curvature can be different. This leads to line contact (circular line) between the complementary contact surface and the bearing contact surface, in particular in the case where no force is applied. When the application force is generated and the reaction forces therefore occur, starting from the line contact, surface contact is formed between the contact surfaces as the force increases owing to elastic flattening of the surfaces. The contact surfaces are thus in close contact. In this way, it is possible to ensure that the centring effect is more pronounced as the force increases.

At least a first centre of the first or the second radius of curvature can have a radial offset relative to the respective rotation axis (spindle bearing or spindle). The radial offset increases the diameter of the circular line which describes the contact between the spherical bearing contact surface and the complementary contact surface of the transitional section, relative to the rotation axis of the spindle. In addition, the contact angle between the contact surfaces is also increased. An increase in the contact angle and the diameter of the circular curve reduce the contact pressure in the contact zone. Wear can thereby be reduced.

As an option, both centres of the first and the second radius of curvature can also have a radial offset relative to the rotation axis of the spindle. In this way, the circular line which describes the contact can be additionally adapted as required.

An electromechanical brake can have an electric motor for actuating the brake, in particular for closing and/or opening the brake. The motor is coupled to the spindle nut in a torque-transmitting manner, and has a brake actuator unit as described above.

The electromechanical brake can be a vehicle brake.

The electromechanical brake optionally has at least one brake pad and one brake disc.

A vehicle can have an electromechanical brake as described above.

As an option, the vehicle can comprise, in particular, a motor vehicle, that is to say a road vehicle. Alternatively, the vehicle can also comprise other types of vehicle, for example aircraft, ships, two-wheelers, motorcycles, or the like. Overall, a vehicle is to be understood in the present case to mean a device which is configured for transporting objects, freight or persons between different destinations. Examples of vehicles are land-based vehicles such as motor vehicles, electric vehicles, hybrid vehicles or the like, rail vehicles, aircraft or watercraft. In the present context, vehicles can be regarded as road vehicles, such as cars, trucks, buses or the like.

BRIEF DESCRIPTION OF DRAWINGS

The disclosure provides greater detail below with reference to the examples illustrated in the drawings, In the drawings.

DETAILED DESCRIPTION

The following detailed description in conjunction with the appended drawings identical numbers refer to identical elements, All of the features disclosed below and/or the accompanying figures can be combined, alone or in any subcombination, with features of the present disclosure provided that the resulting combination of features is worthwhile for a person skilled in the art.

Figure 1:
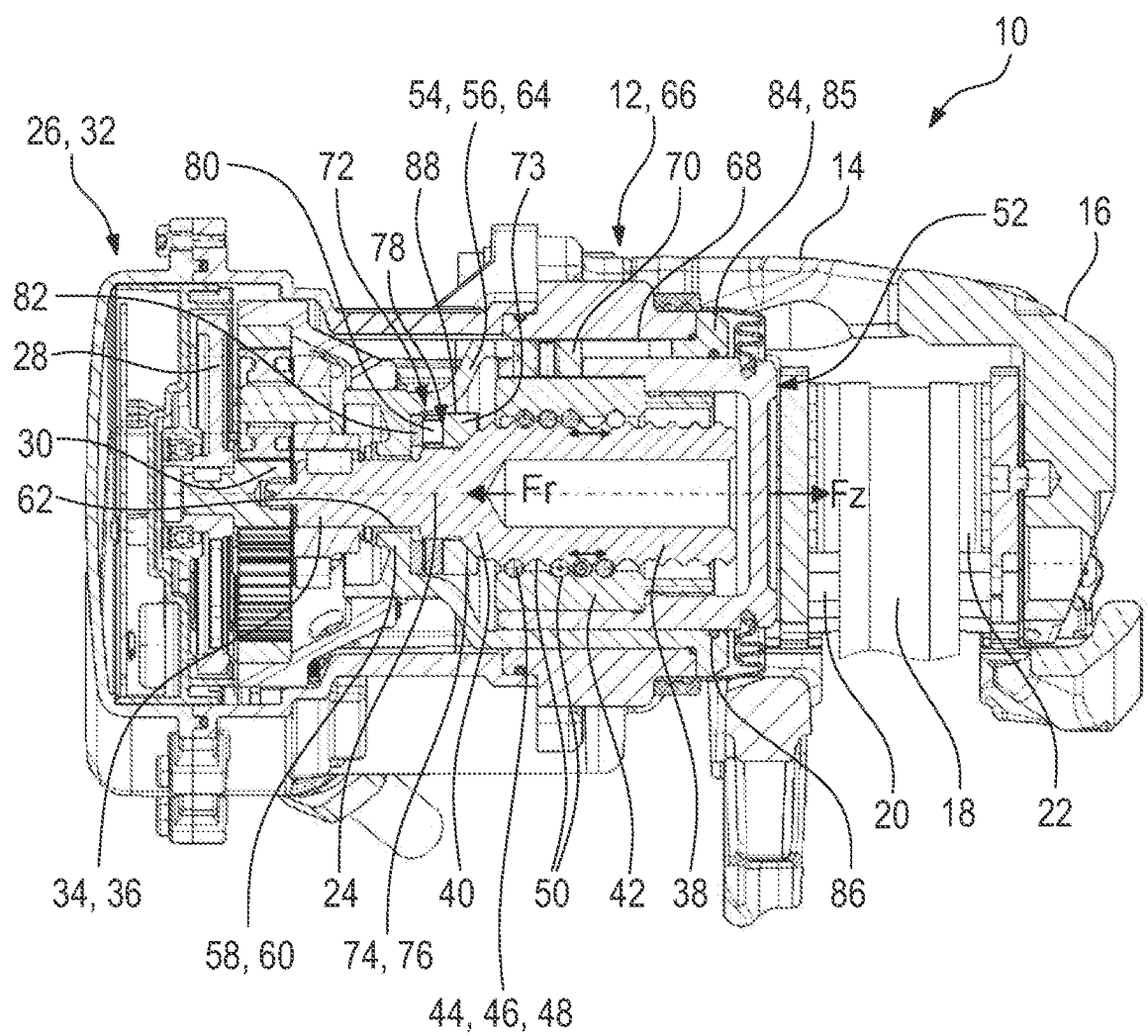
FIG. 1 shows a simplified schematic cross-sectional view of an electromechanical brake according to the disclosure having a brake actuator unit according to the disclosure.

FIG. 1 shows a simplified schematic cross-sectional view of an electromechanical brake 10 having a brake actuator unit 12.

The brake 10 comprises a brake housing 14 with a brake caliper 16. The brake caliper 16 surrounds a brake disc 18, in particular a brake disc rotor, which is bordered in the axial direction by two brake pads 20, 22. The inner brake pad 20 along the rotation axis 24 of the brake actuator unit 12 is subjected actively to an application force Fz by the brake actuator unit 12. In the present case (in the ideal case of compensated transverse forces), the rotation axis 24 of the brake actuator unit 12 also corresponds to the cylinder axis of the brake housing 14 and the brake disc axis of rotation of the brake disc 18.

The axially movable brake caliper 16 ensures that the brake pad 22 which is on the outside in the axial direction is likewise acted upon by the application force Fz. In this case, the application force Fz is distributed substantially uniformly in terms of magnitude between the inner brake pad 20 and the outer brake pad 22. Thus, as a result of the contact pressure force provided, frictional engagement with the brake disc 18 can be ensured for both brake pads 20, 22, said engagement being used to decelerate or hold a vehicle.

The brake 10 furthermore has an electromechanical actuating unit 26, which is used to produce the application force Fz together with the brake actuator unit 12. Relative to the brake actuator unit 12, the electromechanical actuating unit 26 is arranged opposite the brake disc 18 along the rotation axis 24. The electromechanical actuating unit 26 comprises at least one electric motor 28 and a reduction gear assembly 30.

The components of the electromechanical actuating unit 26 are accommodated by the brake housing 14, which can be designed as a skeleton-like frame made of metal or of fibre-reinforced plastic. The electromechanical actuating unit 26 forms a dosed subassembly 32 that can be assembled separately.

The brake actuator unit 12 comprises a spindle 34 with a drive shaft extension 36, a shank section 38 on the brake pad side and a transitional section 40, which is arranged between the drive shaft extension 36 and the shank section 38 along the rotation axis 24 of the spindle 34. The diameter of the drive shaft extension 36 of the brake actuator unit 12 is smaller along the radial direction than the diameter of the shank section 38 along this direction. The spindle 34 tapers correspondingly with respect to its diameter in the region of the transitional section 40.

The brake actuator unit 12 furthermore has a spindle nut 42. In the present case, the spindle drive 44 of the brake actuator unit 12 is designed as a recirculating ball screw, which is free of self-locking. The spindle drive 44 comprises a thread 46, in which balls 48 are arranged and roll. The spindle 34 and the spindle nut 42 have mutually corresponding race parts, which together form the thread 46. The balls 48 can permit a translational movement of the spindle nut 42 along the rotation axis 24 with respect to the spindle 34 along the ball races 50 of the thread 46. For this purpose, the ball races 50 are formed at least partially in the shank section 38 of the spindle 34 and of the spindle nut 42.

The diameter of the ball races 50 corresponds to the diameter of the balls 48, taking into account manufacturing tolerances and required gap dimensions.

Owing to the fact that the spindle nut 42 and the brake piston 52 are separate components, it is possible in the present case to dispense with the need to integrate a ball return mechanism for the balls 48 into the spindle 34. This reduces the manufacturing outlay for the spindle 34.

As a result of the translational movement of the spindle nut 42 in the direction of the brake disc 18, the brake piston 52 is moved in the direction of the inner brake pad 20 and thus ensures the active application of the application force Fz to the inner brake pad 20.

Here, the rotation of the spindle 34 is ensured by the electric motor 28, which is in engagement with the drive shaft extension 36 of the spindle 34 via the reduction gear assembly 30. The gradients of the spindle drive 44, in particular of the ball races 50, then have the effect that the rotation of the spindle 34 brings about a translational movement of the spindle nut 42. This movement is transmitted to the brake pads 20, 22 via the brake piston 52. The generated application force Fz is proportional to the torque which is produced at the drive shaft extension 36 by the electric motor 28 and the reduction gear assembly 30.

The brake actuator unit 12 further comprises a cup sleeve 54, which has a side wall 56 and a base 58. The open end of the cup sleeve 54 is arranged on the brake pad side along the rotation axis 24. This means that the base 58 is arranged at the opposite end of the cup sleeve 54 from the brake disc 18. The base 58 has a through-hole 60 for the drive shaft extension 36 of the spindle 34, which is held therein via a radial bearing 62.

The cup sleeve 54 is coupled in such a way to the electromechanical actuating unit 26, via a positive connection which is movable along the rotation axis 24, that the reduction gear assembly 30 is centred with respect to the cup sleeve 54. The movable positive connection can comprise, for example, a shaft-hub connection with spline toothing or a slot-and-key connection.

The side wall 56 and the base 58 define an interior space 64 of the cup sleeve 54, in which at least the spindle 34, the spindle nut 42 and the brake piston 52 are at least partially arranged. Owing to the linear mobility of the spindle nut 42 and of the brake piston 52, these components may also be arranged at least partially outside the interior space 64.

The cup sleeve 54 makes it possible to design the brake actuator unit 12 as a separate subassembly 66. For the subassembly 66, the brake housing 14 has a corresponding receiving space 68, in which the subassembly 66 can be positioned and is thus supported radially and axially therein.

Within the brake actuator unit 12, the spindle nut 42 is guided linearly and secured against rotation with respect to the brake housing 14 and the cup sleeve 54 via a rotary lock 70. For this purpose, the cup sleeve 54 can have an axial groove which is in engagement with a projection on the spindle nut 42 which forms the rotary lock 70.

As a result of the generated application force Fz, a reaction force Fr, which is opposite to the application force Fz, occurs along the rotation axis 24. Owing to the elastic expansion of the components of the brake 10, an angular misalignment can generally occur between the brake disc axis of rotation and the cylinder axis of the brake housing 14, with the result that the reaction force Fr has off-centre force components. These off-centre force components can lead to instability of the components of the brake actuator unit 12 along the radial direction, particularly if the core diameter of the spindle drive 44 is smaller than the outside diameter of a bearing which is intended to absorb the reaction force Fr.

In the present case, therefore, the brake actuator unit 12 comprises a rotationally symmetrical spindle bearing 72 embodied as an axial bearing with a bearing ring 73 which has a spherical bearing contact surface 74 arranged on the brake pad side. The spindle bearing 72 is in contact with the transitional section 40 of the spindle 34, which has a contact surface 76 complementary to the spherical bearing contact surface 74.

The bearing ring 73 furthermore has a planar contact surface 78, which is arranged opposite the spherical bearing contact surface 74 along the rotation axis 24.

Furthermore, the brake actuator unit 12 has rolling elements 80, which are in contact with the planar contact surface 78.

Arranged between the axial bearing 80 and the base 58 of the cup sleeve 54 there is, in addition, a bearing disc 82, which has opposite planar contact surfaces along the rotation axis 24 and is pressed into the cup sleeve 54 in a rotationally secure manner by frictional and/or positive locking. One of the contact surfaces of the bearing disc 82 is in contact with the base 58 of the cup sleeve 54. The rolling elements 80 roll on the other of the two contact surfaces of the bearing disc 82.

Thus, the reaction force Fr which occurs is transmitted from the shank section 38 of the spindle 34, via the transitional section 40, to the spherical bearing contact surface 74 of the spindle bearing 72, and from there is absorbed by the base 58 of the cup sleeve 54 via the rolling elements 80 and the bearing disc 82.

In the region of the end of the cup sleeve 54 on the brake pad side, the said sleeve has a radially formed shoulder 84, which is formed integrally with the side wall 56, acts as a stop 85 and via which the cup sleeve 54 is supported on the brake housing 14. Thus, the reaction force Fr absorbed by the base 58 of the cup sleeve 54 is transmitted to the brake housing 14 via the side wall 56 and the stop 85.

The shoulder 84 can optionally also be implemented by a snap ring arranged in a radial groove of the side wall 56 of the cup sleeve 54.

In order, in particular, to protect the spindle drive 44, the cup sleeve 54 furthermore has an inner radial groove in which a seal 86 is arranged and which acts between the cup sleeve 54 and the brake piston 52.

Since the outside diameter 88 of the spindle bearing 72 is greater than the core diameter of the spindle nut 42, it is possible to dispense with a separate thread run-out for the spindle nut 42 in the region of the shank section 38. This function is implemented by the spindle bearing 72. It is thereby possible to save installation space along the rotation axis 24, that is to say in the axial direction, especially if the ball races 50 of the spindle drive 44 have high thread pitches.

Figure 2:
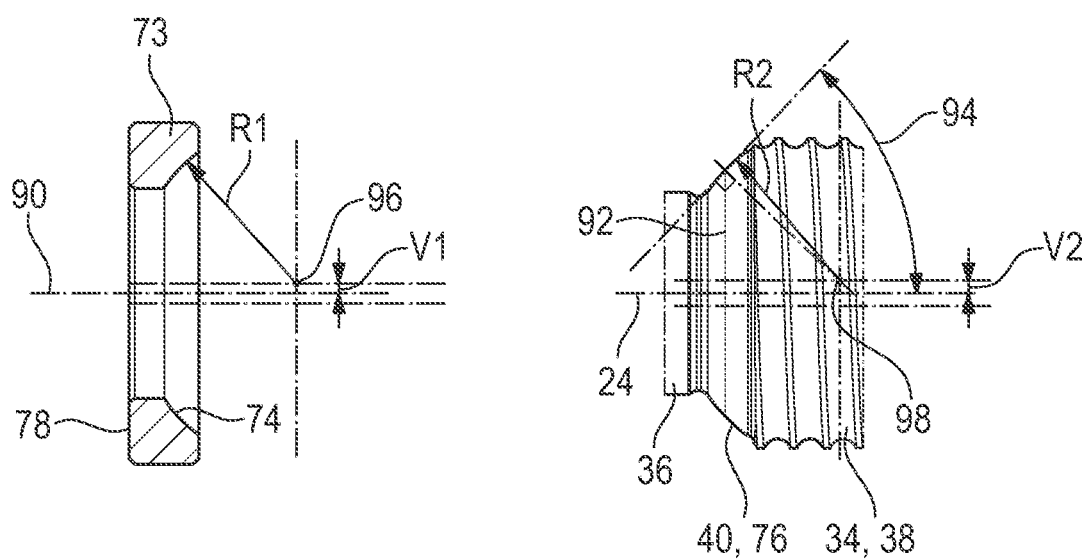
FIG. 2 shows a simplified schematic cross-sectional view of the contact surfaces of the spindle bearing and of the spindle.

FIG. 2 shows a simplified schematic cross-sectional view of the contact surfaces 74, 76 of the spindle bearing 72 and of the spindle 34.

Along its rotation axis 90, the spindle bearing 72 has the spherical bearing contact surface 74 on the brake pad side and, opposite thereto, the planar contact surface 78 for contact with the rolling elements 80.

The spherical bearing contact surface 74 has a first radius of curvature R1.

Between the drive shaft extension 36 and the shank section 38 along the rotation axis 24, the spindle 34 has the transitional section 40, which has a contact surface 76 complementary to the spherical bearing contact surface 74.

The complementary contact surface 76 has a second radius of curvature R2.

In the ideal case (compensated transverse forces), the rotation axis 90 of the spindle bearing 72 coincides with the rotation axis 24 of the spindle 34.

At least one of the spherical bearing contact surface 74 and the complementary contact surface 76 is convex, while the other is concave.

The first radius of curvature R1 and the second radius of curvature R2 may be equal, thereby providing surface contact between the contact surfaces 74, 76.

However, the first radius of curvature R1 and the second radius of curvature R2 can be different, with the result that, in the case where no force is applied, line contact in the form of a circular line 92 occurs between the contact surfaces 74, 76. The centre of the circular line 92 is congruent with the rotation axis 24 of the spindle 34. As the reaction force Fr increases, elastic flattening of the contact surfaces 74, 76 leads to the line contact expanding to surface contact.

In order to make the diameter of the circular line 92 as large as possible at half the contact angle 94, the centre 96 of the first radius of curvature R1 and/or the centre 98 of the second radius of curvature R2 can in each case have an offset V2 along the radial direction with respect to the respective rotation axis 90, 24. Such an offset V1, V2 has the effect that the diameter of the circular line 92 is increased and the contact between the contact surfaces 74, 76 is displaced radially outwards. This makes it possible for restoring forces that are greater in terms of magnitude to be generated in the direction of the rotation axes 90, 24. In particular, the enlargement of the contact angle 94 and of the diameter of the circular line 92 leads to a reduction in the contact pressure in the contact zone between the contact surfaces 74, 76. The centring effect of the spherical bearing contact surface 74 of the spindle bearing 72 is thereby improved.

The invention claimed is:

1. A brake actuator unit for an electromechanical brake, the brake actuator unit comprising:
   a spindle;
   a spindle nut;
   a brake piston;
   a spindle bearing, which receives the spindle, has a spherical bearing contact surface and absorbs axial reaction forces of the spindle when the brake is actuated; and
   a cup sleeve, which has a base and which accommodates the brake piston and the spindle nut in its interior space.

2. The brake actuator unit according to claim 1, wherein the spindle bearing is supported on the base of the cup sleeve.

3. The brake actuator unit according to claim 1, wherein the spindle bearing is an axial rolling bearing, via which the axial reaction forces of the spindle are absorbed.

4. The brake actuator unit according to claim 3, wherein a bearing disc of the spindle bearing rests against the base of the cup sleeve and is pressed into the cup sleeve in a manner such that the cup sleeve is secured against rotation by frictional engagement.

5. The brake actuator unit according to claim 1,
   further comprising a brake housing in which the cup sleeve, the spindle nut and the brake piston are accommodated, and
   wherein the cup sleeve has an axial stop, which supports the cup sleeve on the brake housing when the brake is actuated.

6. The brake actuator unit according to claim 5, wherein the axial stop is a radial shoulder formed on the cup.

7. The brake actuator unit according to claim 5, wherein the cup sleeve is inserted axially into the brake housing and is supported radially in the brake housing.

8. The brake actuator unit according to claim 1,
   wherein a rotary lock is provided between the cup sleeve and the spindle nut, the spindle nut being accommodated within the cup sleeve in a linearly movable manner, and allows a linear movement of the spindle nut but prevents a rotation of the spindle nut relative to the cup sleeve.

9. The brake actuator unit according to claim 1, wherein a seal is provided on a brake pad side between the brake piston and the cup sleeve.

10. The brake actuator unit according to claim 5, wherein the brake housing has a brake caliper.

11. The brake actuator unit according to claim 1, wherein the spherical bearing contact surface has a first radius of curvature, wherein the complementary contact surface has a second radius of curvature, and wherein the first radius of curvature and the second radius of curvature are different.

12. The brake actuator unit according to claim 11, wherein at least a first center of the first radius of curvature or of the second radius of curvature has a radial offset relative to a rotation axis of the spindle.

13. The brake actuator unit according to claim 6,
   wherein the cup sleeve includes a radial groove, and
   wherein a snap ring is arranged in the radial groove.

14. The brake actuator unit according to claim 5, wherein the brake housing has a recess that corresponds at least partially to an outer contour of the cup sleeve.

15. The brake actuator unit according to claim 3, wherein a bearing disc of the spindle bearing rests against the base of the cup sleeve and is pressed into the cup sleeve in a manner such that the cup sleeve is secured against rotation by positive engagement.

16. A brake actuator unit comprising:
   a spindle;
   a spindle nut;
   a brake piston; and
   a spindle bearing, which receives the spindle, has a spherical bearing contact surface and absorbs axial reaction forces of the spindle when the brake is actuated,
   wherein the spindle has, on a brake pad side, a cross-sectionally thickened shank section, which has a thread of the spindle on an outer circumferential surface and has a drive shaft extension, which is smaller in cross section than the said shank section, as well as a transitional section between the shank section and the drive shaft extension, wherein the spherical bearing contact surface rests against a complementary contact surface on the transitional section.

17. An electromechanical brake comprising:
   a brake actuator unit including:
      a spindle;
      a spindle nut;
      a brake piston;

a spindle bearing, which receives the spindle, has a spherical bearing contact surface and absorbs the axial reaction forces of the spindle when the brake is actuated; and a cup sleeve, which has a base and which accommodates the brake piston and the spindle nut in its interior space; and an electric motor for actuating the brake, which is coupled to the spindle nut in a torque-transmitting manner.

* * * * *